United States Patent Office 3,067,230
Patented Dec. 4, 1962

3,067,230
PROCESS FOR PREPARING ORGANOSILICON COMPOUNDS
Paul F. Silva, Jonesville, and Norman G. Holdstock, Scotia, N.Y., assignors to General Electric Company, a corporation of New York
No Drawing. Filed May 31, 1961, Ser. No. 113,619
6 Claims. (Cl. 260—448.2)

This invention is directed to a process for making certain halogenated organosilyl-substituted aromatic hydrocarbons. More particularly, the present invention relates to a process for making bis-(diorganohalosilyl) aromatic hydrocarbons having the formula (1)      $X(R')_2SiRSi(R')_2X$ where R is an arylene radical, R' is a monovalent hydrocarbon radical and X is a halogen radical.

Bis-(diorganohalosilyl) aromatic hydrocarbons of the type described in Formula 1 are known in the art and can be prepared by the method shown in Patent 2,561,429—Sveda by reacting a diorganodihalogenosilane and a dihalo-substituted aromatic hydrocarbon in the presence of an active metal such as magnesium or sodium. The reaction of this Sveda patent is as follows:

(2)    $(R')_2Si(X)_2 + R(X)_2 \xrightarrow{Mg} X(R')_2SiRSi(R')_2X + MgX_2$ where R, R' and X are as previously defined.

These organosilyl-substituted aromatic hydrocarbons are valuable intermediates for the production of linear organosilicon polymers as disclosed in the aforementioned Sveda patent. Although the Sveda method is directed to the production of the monomeric materials within the scope of Formula 1, the practice of this method also results in the formation of a substantial amount of polymer having the formula (3)      $X(R')_2Si[RSi(R')_2]_nX$ where R, R' and X are as previously defined and n is an integer equal to from 2 to 5, inclusive. While the monomeric materials of Formula 1 are useful as previously described, the polymeric materials of Formula 3 cannot be used in the formation of the aforementioned linear polymers, and therefore usually must be discarded. The present invention is based on the discovery of a method for converting the polymeric materials within the scope of Formula 3 to the useful bis-(diorganohalosilyl) aromatic hydrocarbons within the scope of Formula 1.

In accordance with the practice of the present invention, the bis-(diorganohalosilyl) aromatic hydrocarbons of Formula 1 are formed by a process which comprises (A) heating in a closed system at a temperature in the range of from about 100° C. to 300° C. a mixture comprising, by weight, (1) 1 part of polymeric material within the scope of Formula 3, (2) from 2 to 10 parts, and preferably 2 to 5 parts, of a diorganodihalogenosilane having the formula (4)      $(R')_2SiX_2$ (3) from 0.001 to 1 part, and preferably 0.01 to 0.1 part of a polyvalent metal halide having the formula (5)      $M(X)_a$ and (4) from 0 to 0.1 part of a silicon hydride having the formula (6)      $HSi(R')_b(X)_{3-b}$ and (B) separating a bis-(diorganohalosilyl) aromatic hydrocarbon within the scope of Formula 1 from the resulting reaction product, where R' and X are as previously defined, M is a metal ion selected from the class consisting of magnesium, iron, boron and aluminum ions, $a$ is an integer equal to from 2 to 3 and also equal to the valence of the metal M, and $b$ is a whole number equal to from 0 to 3, inclusive.

Included among the radicals represented by R in the preceding formulae are, for example, phenylene, naphthalene, tolylene, etc. Included within the scope of R' radicals of the preceding formulae are, for example, aryl radicals, e.g. phenyl, tolyl, naphthyl, etc. radicals; aralkyl radicals, e.g. phenylethyl, benzyl, etc. radicals; alkyl radicals, e.g., methyl, ethyl, propyl, butyl, octyl, etc. radicals; alkenyl radicals, e.g. vinyl, allyl, etc. radicals; cycloalkyl radicals, e.g. cyclohexyl, cycloheptyl, etc. radicals, and cycloalkenyl radicals, e.g. cyclohexenyl, cycloheptenyl, etc. radicals. When more than one R radical is present in the compositions of any of the preceding formulae it is preferred that each of these R radicals be the same. However, it should be understood that within the scope of the present invention are compositions in which the various R radicals are different. Likewise it is preferable that all of the R' radicals be the same, but mixtures of various R' radicals can be present in any composition employed in the practice of the present invention. Among the radicals represented by X are chloro, bromo, iodo, etc. radicals. The various halogen radicals represented by X can also be the same or different radicals in the same composition. Preferably the process of the present invention employs compositions in which R' is methyl and X is chlorine or a mixture of chlorine and bromine.

While Patent 2,561,429—Sveda is directed to the preparation of monomeric materials from dihalobenzenes it should be understood that by following the method of this Sveda patent a host of products within the scope of Formula 1 can be formed by reacting (1) a dihalo-substituted aromatic hydrocarbon such as p-dichlorobenzene, p-dibromobenzene, 1,4-dibromonaphthalene, 2,7-dibromonaphthalene, 1,4-dibromo-2-methylbenzene, etc. with a diorganodihalogenosilane within the scope of Formula 4 such as dimethyldichlorosilane, diethyldichlorosilane, methylcyclohexyl dichlorosilane, methylvinyldichlorosilane, methylphenyldichlorosilane, diphenyldichlorosilane, etc. Among the monomeric materials within the scope of Formula 1 which are prepared by reacting ingredients of the above type in accordance with the process of Patent 2,561,429—Sveda are, for example, 1,4-bis-(dimethylchlorosilyl) benzene; 1,3-bis-(dimethylchlorosilyl) benzene; 1,4-bis-(dimethylchlorosilyl) naphthalene; 2,7-bis-(dimethylchlorosilyl) naphthalene; 1,4-bis-(diethylbromosilyl)-2-methylbenzene; etc.

During the preparation of any of the materials within the scope of Formula 1, the corresponding polymeric materials within the scope of Formula 3 are also formed in an amount which can vary from about 40 to 95 percent by weight, based on the weight of the total reaction mixture. The mixture of the monomeric materials within the scope of Formula 1 and the polymeric materials within the scope of Formula 3 are conventionally separated by fractional distillation to isolate the monomeric materials from the aforementioned polymeric materials. These polymeric materials can thereafter be separated from each other by conventional methods such as fractional distillation at reduced pressures. These polymeric materials separated by the aforementioned procedure can be employed in the process of the present invention to form monomeric materials within the scope of Formula 1.

One unusual aspect of the present invention is that the diorganodihalogenosilane within the scope of Formula 4 which is used to prepare the monomeric materials within the scope of Formula 1 by reaction with an appropriate dihalo-substituted aromatic compound is also reacted with the polymeric material within the scope of Formula 3 to convert the polymeric material to the monomeric material within the scope of Formula 1. However, reaction of the polymeric material within the scope of Formula 3 with the diorganodichlorosilane of Formula 4 alone will not result in the production of the monomeric material within the scope of Formula 1. This reaction can be effected only when the reaction mixture includes the metal halide within the scope of Formula 5 and only when, as will be described in more detail hereinafter, the reaction is effected in a closed system.

As previously mentioned the reaction of the present invention can be carried out in either the presence or the absence of a silicon hydride within the scope of Formula 6. All other things being equal, it has been found that the presence of the silicon hydride in the reaction mixture promotes the yields of the monomeric material within the scope of Formula 1. When the silicon hydride is employed in the reaction, it is preferably employed in an amount equal to from 0.01 to 0.1 part, by weight, per part of the polymeric material within the scope of Formula 3.

In carrying out the process of the present invention the various reactants can be added to a reaction vessel in any desired order. The resulting reaction mixture can then be heated to a temperature of the order of about 100° C. to 300° C. to effect the desired reaction. Some of the reactants employed in the practice of the present invention can be obtained by the practice of the process of the aforementioned Patent 2,561,429—Sveda. For example, when reacting a dihalo-substituted aromatic hydrocarbon with a diorganodichlorosilane in the presence of an active metal such as magnesium, as illustrated by Formula 2 above, it is found that the reaction product includes both a metal salt within the scope of Formula 5 and the polymeric material within the scope of Formula 3 as well as the monomeric material within the scope of Formula 1. By removing the monomeric material within the scope of Formula 1, such as by fractional distillation at reduced pressures, from the reaction mixture and by adding a diorganodihalogenosilane within the scope of Formula 4 to the residue, a reaction mixture is formed that can be utilized in the practice of the present invention.

One critical feature of the present invention is the need for effecting the reaction of the invention in a closed system. By a closed system is meant a system from which the reactants cannot escape. The purpose of such a closed system is to provide a super atmospheric pressure during the course of the reaction. Thus an autoclave or similar sealed equipment can be employed to practice the process of the present invention. It has been found that the autogenous pressure developed during the course of the reaction is sufficient to provide the pressure necessary to carry out satisfactorily the reaction of the present invention. However, an inert gas can also be employed to increase the pressure on the reaction mixture. In general, regardless of whether autogenous pressure is employed or whether an elevated pressure is generated artificially, pressures in the range of from about 50 to 5,000 p.s.i. are useful in practicing the process of the present invention.

Depending on such factors as the temperature employed, the pressure employed, and the nature of the particular reactants employed, times of from as little as 2 hours or less, to 20 hours or more have been found satisfactory to complete the reaction of the present invention. One the reaction has been completed the monomeric material within the scope of Formula 1 can be recovered from the reaction mixture by venting the reaction mixture to the atmosphere and recovering the desired product by fractional distillation at reduced pressures.

In order that those skilled in the art will be better able to understand the practice of the present invention, the following examples are given by way of illustration and not by limitation. All parts are by weight.

*Example 1*

Following the general procedure of Example 1 of Patent 2,561,429—Sveda, a reaction vessel was charged with 400 parts of p-phenylene bromide, 656 parts of dimethyldichlorosilane, 124 parts of metallic magnesium and 496 parts of anhydrous ethyl ether as well as a trace of elemental iodine and 8 parts of methyl iodide. After completion of the reaction, the magnesium halide was separated by filtration and solvents were removed by distillation at atmospheric pressure. The residue was then purified by vacuum distillation to produce a quantity of p-bis-(dimethylchlorosilyl) benzene (7)     $Cl(CH_3)_2SiC_6H_4Si(CH_3)_2Cl$ which was a solid, melting at 87° C. and boiling at 110° C. at 1.5 mm. Another part of the vacuum distillate was a polymeric material within the scope of Formula 3 which had the formula (8)     $Cl(CH_3)_2SiC_6H_4Si(CH_3)_2C_6H_4Si(CH_3)_2Cl$ and which was a solid, melting at 75–80° C. and having a boiling point of 180° C. at 1 mm.

In order to evaluate the conversion of this polymeric material to the p-bis-(dimethylchlorosilyl) benzene of Formula 7, a number of mixtures were prepared consisting of one part of the polymeric material with various proportions of one or more of the following ingredients: dimethyldichlorosilane, magnesium chlorobromide, and methyldichlorosilane. The various reaction mixtures were charged to an autoclave equipped with a pressure gauge and thermocouple and were heated to the reaction temperature. At the end of the reaction, the mixture was filtered, fractionally distilled and the monomeric p-bis-(dimethylchlorosilyl) benzene of Formula 7 was recovered by fractional distillation at reduced pressures.

In Table I below are shown the parts of the various components of the reaction mixture per part of the polymeric material of Formula 8. In addition, the reaction conditions and the percent yield of monomeric p-bis-(dimethylcholorosilyl) benzene of Formula 7 based on the weight of the polymer of Formula 8 are also shown.

TABLE I

| Run | Reaction Mixture | | | Conditions | | | Percent Yield monomer |
|---|---|---|---|---|---|---|---|
| | $(CH_3)_2SiCl_2$ | $MgBrCl$ | $CH_3SiHCl_2$ | Time (hrs.) | Temp. (° C.) | Press. (p.s.i.g.) | |
| 1 | 3.06 | .034 | 0 | 4 | 160 | 90 | 12.0 |
| 2 | 3.40 | .032 | 0 | 4 | 160 | 89 | 10.7 |
| 3 | 3.50 | .031 | .0143 | 24 | 260 | 420 | 14.7 |
| 4 | 3.00 | .033 | .0147 | 24 | 265 | 340 | 21.0 |
| 5 | 3.34 | .034 | .0144 | 4 | 235 | 235 | 19.4 |
| 6 | 3.12 | .034 | .0145 | 0.6 | 275 | 460 | 12.8 |
| 7 | 3.24 | .035 | .0151 | 8.25 | 270 | 280 | 12.3 |
| 8 | 3.14 | .037 | .0145 | 20 | 280 | 470 | 12.0 |
| 9 | 3.10 | 0 | 0 | 2 | 150 | 78 | 0 |
| 10 | 0 | .008 | .005 | 6 | 260 | 0 | 0 |

In runs 1 through 8 of the above table, the reaction mixture includes at least all of the reactants which are essential to the process of the present invention and the data for these runs show the production of a significant yield of monomeric p-bis-(dimethylchlorosilyl) benzene. In runs 1 and 2 the reaction mixture contained only the polymeric material of Formula 8, the dimethyldichlorosilane and the magnesium bromochloride. In runs 3 through 8 the reaction mixture also included methyldichlorosilane which acts as a promoter for the reaction. This promotion effect is best illustrated by the comparison of runs 1 and 2 with run 5 which graphically illustrates the increase of the yield from the order of 10 to 12 percent to more than 19 percent when the methyldichlorosilane was included in the reaction mixture. In run 9, both the magnesium bromochloride and the methyldichlorosilane were omitted from the reaction mixture. As is seen from the data of run 9, this resulted in a zero yield of monomeric material. In run 10, the dimethyldichlorosilane was omitted from the reaction mixture and again the yield was zero.

*Example 2*

Following the procedure of Example 1, a reaction mixture was prepared of 1 part of the polymeric material of Formula 8, 3.35 parts of dimethyldichlorosilane, 0.0145 part of methyldichlorosilane, and 0.039 part of ferric chloride. When this reaction mixture was heated at a temperature of 270° C. for six hours at a pressure of 390 p.s.i., a 6.7% yield of p-bis-(dimethylchlorosilyl) benzene of formula (7) was obtained.

*Example 3*

A reaction vessel is charged with one mole of 2,7-dibromonaphthalene, 5 moles dimethyldichlorosilane, and 2 moles of magnesium metal together with 1 mole of diethyl ether. This reaction mixture is maintained at a temperature of 60° C. for 3 hours and the reaction product is fractionally distilled yielding 2,7-bis-(dimethylchlorosilyl) naphthalene and a mixture of polymeric materials having the formula (9)    $Cl(CH_3)_2Si[C_{10}H_6Si(CH_3)_2]_nCl$ where $n$ is as defined in Formula 3.

Following the procedure of Example 1, one part of the above mixture of polymeric materials is mixed with 3 parts of dimethylchlorosilane, 0.0145 part of dimethyldichlorosilane and 0.03 part aluminum chloride. The resulting mixture is heated at 200° C. for 8 hours in an autoclave at a pressure of 200 p.s.i.g. and 2,7-bis-(dimethylchlorosilyl) naphthalene is separated from the reaction mixture. When the procedure of this example is repeated employing boron trichloride in place of the aluminum chloride, comparable results are obtained.

While the above examples have illustrated a number of the embodiments of our invention it should be understood that the present invention is broadly applicable to the conversion of polymeric materials within the scope of Formula 3 to monomeric materials within the scope of Formula 1 by reacting the monomeric materials with a diorganodihalogenosilane within the scope of Formula 4 and a metal halide within the scope of Formula 5. The reaction mixture can also include the silicon hydride within the scope of Formula 6.

What we claim as new and desire to secure by Letters Patent of the United States is:

1. A process for producing a bis-(diorganohalosilyl) aromatic hydrocarbon having the formula $$X(R')_2SiRSi(R')_2X$$

comprising (A) heating in a closed system at a temperature in the range of 100° C. to 300° C., a mixture comprising by weight, (1) 1 part of polymeric material having the formula $$X(R')_2Si[RSi(R')_2]_nX$$

(2) from 2 to 10 parts of a diorganodihalogenosilane having the formula $$(R')_2SiX_2$$

(3) from 0.001 to 1 part of a polyvalent metal halide having the formula $$M(X)_a$$

and (4) from 0 to 0.1 part of a silicon hydride having the formula $$HSi(R')_b(X)_{3-b}$$

and (B) separating a bis-(diorganohalosilyl aromatic hydrocarbon from the resulting reaction, where X is a halogen radical, R is an arylene radical, R' is a monovalent hydrocarbon radical, $n$ is an integer equal to from 2 to 5, inclusive, M is a metal ion selected from the class consisting of magnesium, iron, boron and aluminum, $a$ is an integer equal to from 2 to 3 and is equal to the valence of M, and $b$ is a whole number equal to from 0 to 3, inclusive.

2. A process in accordance with claim 1 which is conducted under autogenous pressure.

3. A process in accordance with claim 1 in which the polyvalent metal halide is magnesium bromochloride.

4. A process in accordance with claim 1 in which the polyvalent metal halide is ferric chloride.

5. A process in accordance with claim 1 in which the silicon hydride is methyldichlorosilane.

6. A process for producing 1,4-bis-(dimethylchlorosilyl) benzene comprising heating to a temperature in the range of 160° to 280° C. under autogenous pressure, a mixture comprising by weight, one part of a polymer having the formula $$Cl(CH_3)_2SiC_6H_4Si(CH_3)_2C_6H_4Si(CH_3)_2Cl$$

2 to 10 parts of dimethyldichlorosilane, 0.001 to 1 part of magnesium bromochloride, and .01 to 0.1 part of methyldichlorosilane, and separating 1,4-bis-(dimethylchlorosilyl) benzene from the resulting reaction product.

References Cited in the file of this patent

UNITED STATES PATENTS

| | | |
|---|---|---|
| 2,561,429 | Sveda | July 24, 1951 |
| 2,774,779 | Gilkey | Dec. 18, 1956 |